Nov. 4, 1947.  P. GRANT  2,430,169
GEAR SHIFTING MECHANISM
Filed Feb. 7, 1946  2 Sheets-Sheet 1

Inventor,
Philippe Grant
By Louis H. Carreau
Attorney

Nov. 4, 1947.  P. GRANT  2,430,169
GEAR SHIFTING MECHANISM
Filed Feb. 7, 1946  2 Sheets-Sheet 2

Inventor,
Philippe Grant
By Louis H. Carreau
Attorney

Patented Nov. 4, 1947

2,430,169

UNITED STATES PATENT OFFICE 2,430,169

GEAR SHIFTING MECHANISM

Philippe Grant, Overbrooke, Ontario, Canada

Application February 7, 1946, Serial No. 646,140

4 Claims. (Cl. 74—354)

My invention relates to gear shifting mechanisms for motor vehicles.

An object of the invention is to provide a gear shifting mechanism for motor vehicles wherein changing from low to intermediate or vice versa, or from intermediate to high or vice versa, is effected without the operation of the clutch. The clutch is used only when shifting from low to reverse or vice versa.

In the drawings, wherein like numerals of reference indicate corresponding parts in the various figures.

Figure 1:
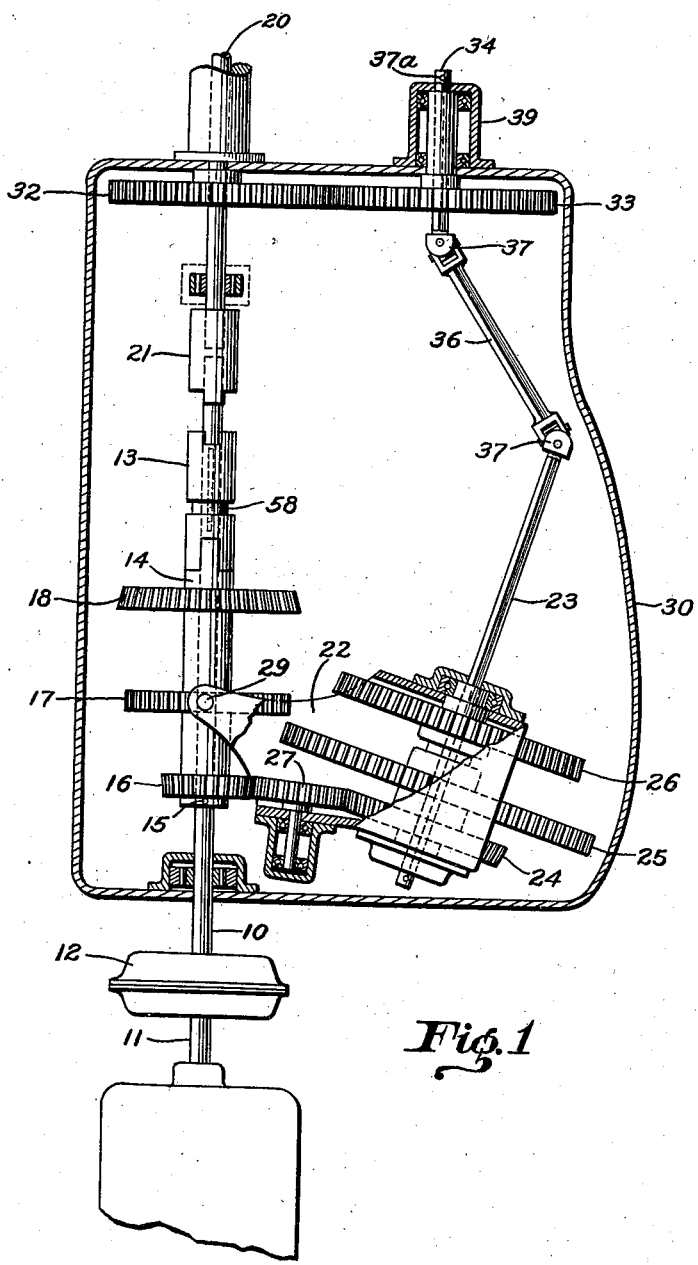
Figure 1 is a top plan view of the gear box and enclosed gears.
Figure 3:
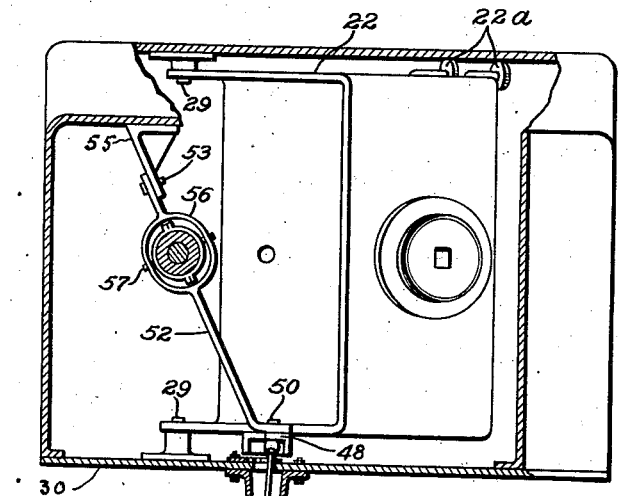
Figure 3 is a section on line 3—3 in Figure 2.
Figure 4:
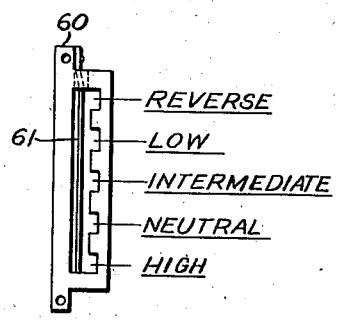
Figure 4 is a fragmentary side elevation of Figure 3.
Figure 2:
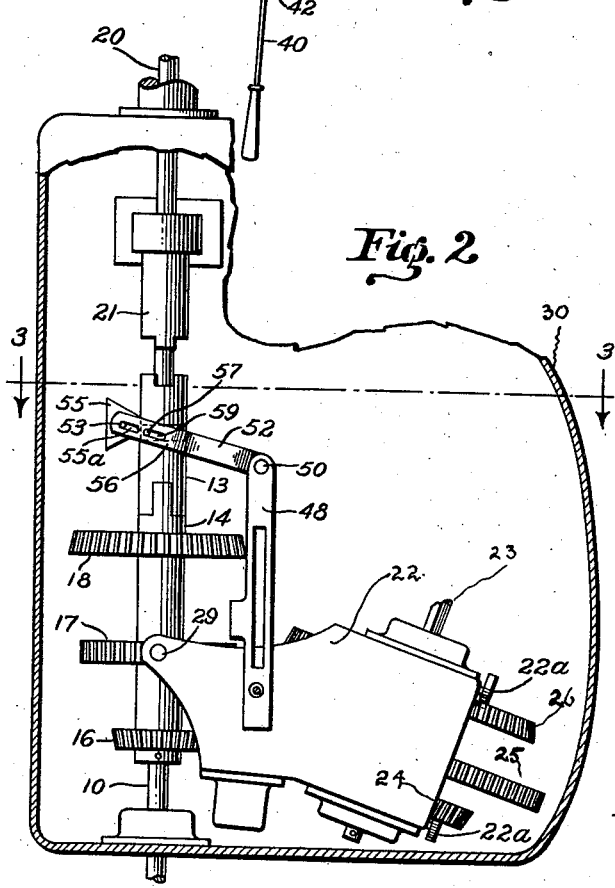
Figure 2 is a more or less diagrammatic view of Figure 1.

Referring now to the drawings, 10 is a driving shaft which is operatively connected to and disconnected from the motor shaft 11 by means of a conventional clutch 12. Splined to the shaft 10 is a sleeve clutch member 13, which is adapted to operatively engage with or disengage from the driven shaft 20, more particularly to engage a clutch member 21 rigid with the shaft 20. When the clutch members 13 and 21 are engaged both shafts 20 and 10 will rotate as a unit, and if the clutch is engaged, direct drive or high speed will result.

The sleeve clutch member 13 is adapted to engage and disengage a second clutch member 14 loose on the shaft 10 to rotate thereon but restrained from axial movement thereon as by a pin 15 rigid on the sleeve and riding in a transverse groove (not shown) formed into the shaft 10.

Rigid on the sleeve 14 are three gears 16, 17 and 18, of different effective diameters. Journalled in a member 22 is a shaft 23 on which three gears 24, 25 and 26 are splined. Also journalled in the member 22 is an idling gear 27 permanently in mesh with the gear 24. The gears 24, 25 and 26 are mounted so to be in fixed relationship, while the shaft 23 is free to move axially in the gears. Gears 27, 25 and 26 are adapted to mesh with gears 16, 17 and 18, respectively. The member 22 is pivotally mounted as at 29 to a casing or housing 30 enclosing the gears and shafts aforesaid and is supported at its free end by rollers 22A journalled on the member 22 and riding in the casing.

Rigid on the driven shaft 20 is a gear 32 meshing with a gear 33 fixed to a shaft 34. The shafts 23 and 34 are operatively connected by a coupling shaft 36 and universal couplings 37—37, all three shafts forming a unit countershaft.

The shaft 34 is journalled in a suitable bearing 39 in which it is held against axial movement by a cotter pin 37A and by the gear 33 which is fixed to the shaft. When the member 22 is in the position shown in Figure 1, with gears 27 and 16 in mesh but with gears 25 and 26 disengaged from gears 17 and 18, the driven shaft 20 will rotate in a direction opposite to that of the driving shaft 10; in other words, the gear shifting mechanism will be in "reverse." The gears 18 and 17, and the gears 25 and 26, are so formed and spaced, and are of such effective diameters, that gears 25 and 17, and gears 26 and 18, will engage successively for "low" and "intermediate" speeds, by an anti-clockwise rotary displacement of the member 22. Continued such rotary displacement will cause disengagement of gears 26 and 18, and as will be explained later, the clutch member 13 will disengage the clutch member 14 to subsequently engage the clutch members 21 to thereby effectively couple the driven shaft 20 directly to the driving shaft 10.

In order to bodily move the member 22 in an arc of a circle on its pivots 29 to shift gears as desired, that is, to change speed, there is provided a shifting lever 40 suitably mounted for rocking movement in two planes and for axial movement. Conveniently, the lever may include a pin 41 journalled in a slotted roller bearing journalled at opposite ends in a bearing 43 forming part of a bracket 44 secured to the casing. The lever is slotted longitudinally as at 46 to slidably receive the pin 41. The lower end of the lever is suitably connected to one end of a link 48 for relative movement in two places. Conveniently, the lower end of the lever may carry a ball (not shown) journalled in a spherical bearing 49 secured to the link 48. The other end of the link is pivotally connected as at 50 to the upper end of a lever 52 which is pivotally supported as at 53, at the lower end thereof to a bracket 55 secured to the casing. The bracket 55 is slotted as at 55A to permit of a certain longitudinal movement of the lever 52 relatively to the pivotal connection or pin 53. The lever is formed, intermediate of its length, with a fork 56 mounting oppositely-disposed pins 57 engaging in a transverse groove 58 formed in the periphery of the coupling member 13. The fork is slotted as at 59 to permit of a certain longitudinal movement of the lever 52 relatively to the pins 57. The fork 56 is positioned lengthwise of the lever 52 appreciably nearer to the pin 53 than to the pin 50, so that for a given arcuate movement of the upper end of the lever 52, the longitudinal movement of the fork, more particularly of the pins 57, will be greatly less.

The gears 18 and 26 are so formed and the co-engaging effective portions of the coupling members 13 and 21 are such, that the coupling members 13 and 21 will effectively engage shortly after the gears 18 and 26 will effectively disengage, and the coupling members 13 and 14 also disengage, and vice versa, so that the device will be shifted or operated to change successively and effectively from "intermediate" to "high" or direct drive, and vice versa. Obviously, and it follows that, when the gears 17 and 25 are in mesh, for "low" speed, the gears 18 and 26 will be disengaged and similarly the coupling members 13 and 21 will be disengaged or in inoperative relationship. "Neutral" position is reached when the coupling member 13 is disengaged both from the coupling members 14 and 21.

Figure 5:
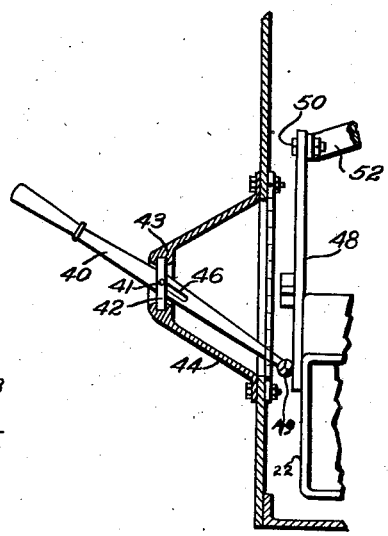
Figure 5 is a more or less diagrammatic view of the shifting lever locking means.

In order to releasably lock the shifting lever 40 in selected position, for "reverse," "low," "intermediate," "high" or "neutral," any suitable device may be provided, which may take the form shown in Figure 5, comprising a rake-like bar 60 notched to receive the lever in the selected position and a spring 61 opposite the notched bar to urge the lever in either of the selected positions.

I claim:

1. In a gear shifting mechanism, the combination of a driving shaft, at least two gears rotatable with said shaft, a driven shaft, a countershaft rotatable with said driven shaft, at least two gears rotatable with said countershaft, and means journalling said last-named gears adapted to be bodily moved in an arc of a circle successively to cause said last-named gears to operatively engage with said first-named gears to vary the relative rotary speeds of said driving and driven shafts.

2. In a gear shifting mechanism, the combination of a driving shaft, at least two gears rotatable with said shaft, a driven shaft, a movable coupling between said shafts to operatively connect and disconnect said shafts, a countershaft rotatable with said driven shaft, at least two gears rotatable with said countershaft adapted to mesh with said first-named gears to provide a speed differential between driving and driven shafts, means journalling said last-named gears adapted to be moved in an arc of a circle to cause the operative engagement and disengagement of either of said last-named gears with one of said first-named gears, and an operative connection between said means and said coupling operating to operatively disconnect said driving and driven shafts when either of said last-named gears is in operative connection with one of said first-named gears.

3. In a gear shifting mechanism, the combination of a driving shaft, at least three gears rotatable with said shaft, a driven shaft, a movable coupling between said shafts operable to operatively connect and disconnect said shafts, a countershaft rotatable with said driven shaft, at least three gears rotatable with said countershaft, a pivotally supported member journalling said last-named gears and adapted to be moved to cause the operative engagement and disengagement of either of said last-named gears with one of said first-named gears to provide speed differentials between said driving and driven shafts, means for moving said member to gear interengagement to provide the selected speed differential, and an operative connection between said member and said coupling to cause the operative connection of said driving and driven shafts when all of said gears are in disengaged relationship.

4. In a gear shifting mechanism, the combination of a driving shaft, gears rotatable with said shaft, a driven shaft, a movable coupling between said shafts to operatively connect and disconnect said shafts, a countershaft rotatable with said driven shaft, gears rotatable with said countershaft, adapted to co-operate with said first-named gears for speed differentials between said driving and driven shafts, a member journalling said last-named gears and adapted to be moved in an arc of a circle to move said gears into operative and inoperative speed-differential relationship, an operative connection between said member and said coupling operable to operatively connect said driving and driven shafts when none of said gears are in speed-differential engagement and to operatively disconnect such shafts when either of said gears are in speed-differential relationship.

PHILIPPE GRANT.

REFERENCES CITED

The following references are of record in the file of this patent:

UNITED STATES PATENTS

| Number | Name | Date |
| --- | --- | --- |
| 418,281 | Elliott | Dec. 31, 1889 |
| 829,068 | Fox | Aug. 21, 1906 |